United States Patent [19]

Terhune

[11] Patent Number: 4,693,022
[45] Date of Patent: Sep. 15, 1987

[54] GARDEN TOOL

[75] Inventor: John J. Terhune, Sierra Vista, Ariz.

[73] Assignee: T. Entrepreneur, Inc., Sierra Vista, Ariz.

[21] Appl. No.: 829,211

[22] Filed: Feb. 14, 1986

[51] Int. Cl.[4] .................. A43C 17/02; A43C 13/00
[52] U.S. Cl. .................................... 36/132; 36/136; 30/297
[58] Field of Search ............. 36/136, 113, 132, 116, 36/124; 30/297

[56] References Cited

U.S. PATENT DOCUMENTS

| 294,715 | 3/1884 | Alinder | 36/113 |
|---|---|---|---|
| 391,738 | 10/1888 | Cross | 36/113 |
| 607,392 | 7/1898 | Brune | 36/132 |
| 664,627 | 12/1900 | Eberlein | 30/297 |
| 1,138,076 | 5/1915 | Brigance | 36/113 |
| 1,493,322 | 5/1924 | Carter et al. | 36/113 |
| 1,515,665 | 11/1924 | Eck | 36/132 |
| 1,537,761 | 5/1925 | Geisman | 36/113 |
| 2,179,942 | 11/1939 | Lyne | 36/132 |
| 2,220,291 | 11/1940 | Savoy | 36/127 |
| 2,714,768 | 8/1955 | Badler | 36/113 |
| 2,779,262 | 1/1957 | Furr et al. | 30/297 |
| 2,802,264 | 8/1957 | Smith | 30/297 |
| 3,346,971 | 10/1967 | Kiwala | 36/136 |
| 4,035,935 | 7/1977 | Forrest | 36/136 |
| 4,490,911 | 1/1985 | Schultz | 30/297 |
| 4,507,881 | 4/1985 | Fossa | 36/132 |

FOREIGN PATENT DOCUMENTS

| 206225 | 1/1909 | Fed. Rep. of Germany | 36/113 |
|---|---|---|---|
| 709612 | 8/1931 | France | 36/113 |

Primary Examiner—Werner H. Schroeder
Assistant Examiner—Steven N. Meyers
Attorney, Agent, or Firm—Henderson & Sturm

[57] ABSTRACT

An agricultural or garden tool attachment for shoes or boots including a bracket, a garden tool adjustably attached to the bracket and an encompassing structure for extending under and around the toe or heel of a boot or shoe. Strap are provided for attaching the encompassing structure to the shoe or boot. Other garden tools designed for many different purposes can be interchangeably attached to the bracket.

10 Claims, 15 Drawing Figures

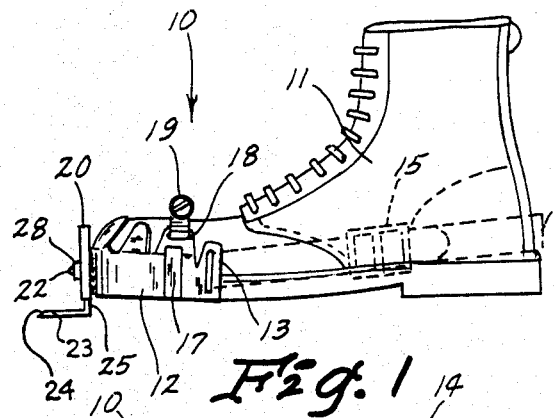
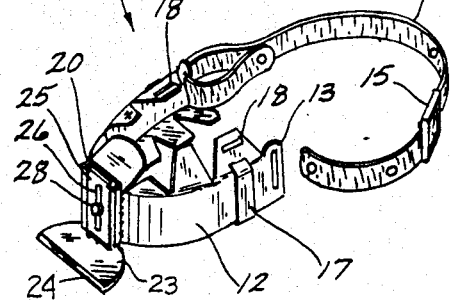
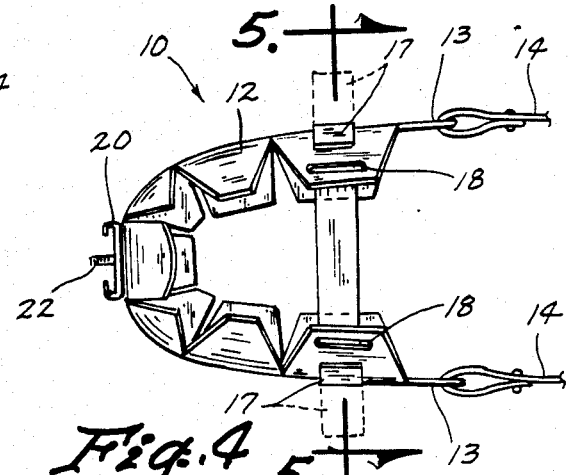
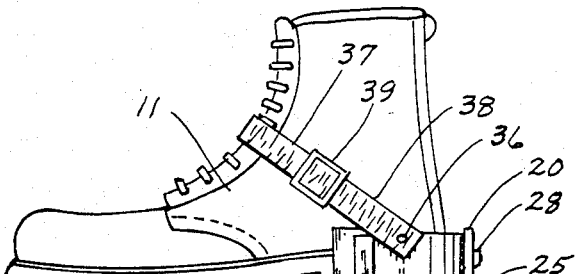
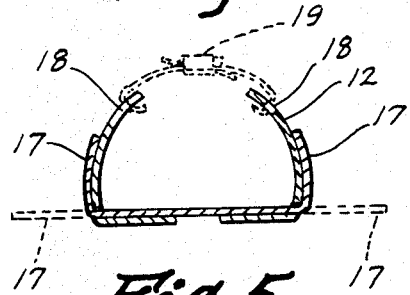
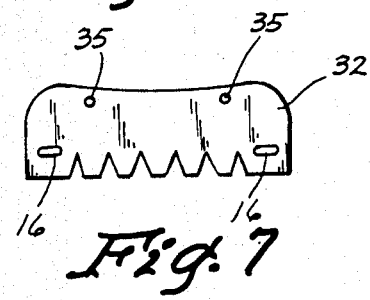
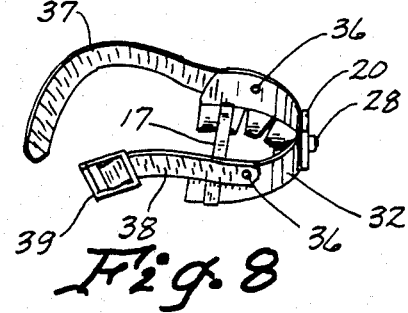

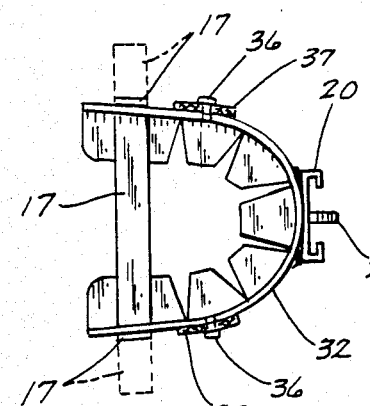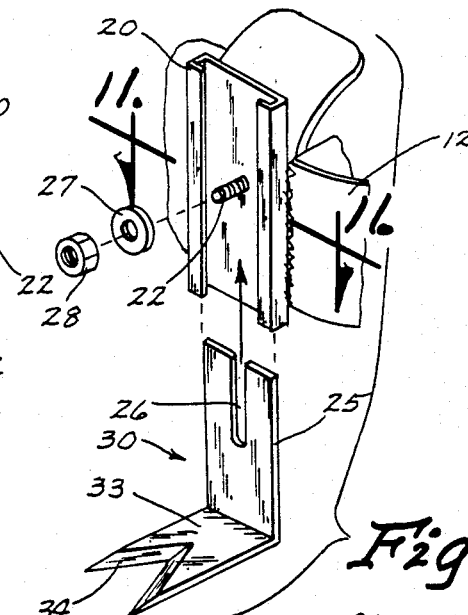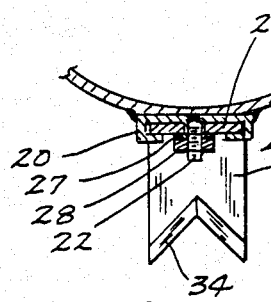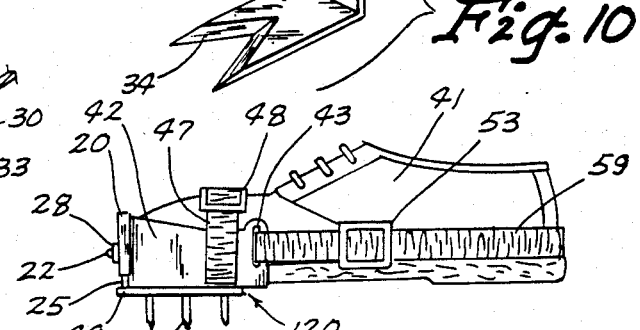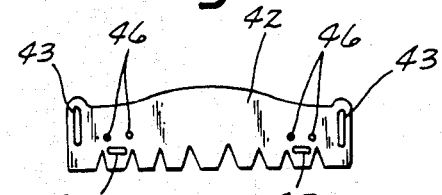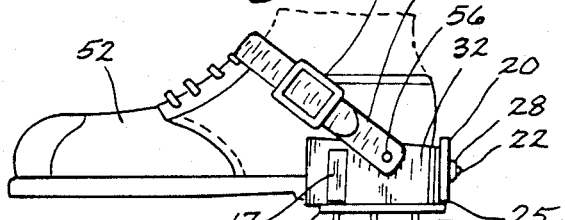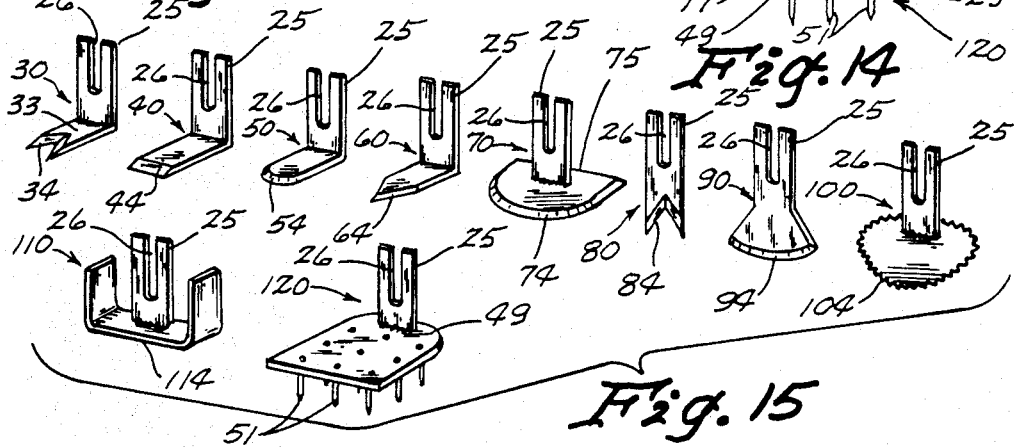

়4,693,022

GARDEN TOOL

TECHNICAL FIELD

The present invention relates generally to garden and agricultural tools and more particularly to garden and agricultural tools for attachment to a boot or shoe.

BACKGROUND ART

Laborers in the commercial agricultural field use a short handled hoe to do the precision work required to cultivate crops, extract roots and remove vegetation. This work is called "stoop labor" and is opposed by organized labor unions and others. A long handled hoe cannot be used satisfactorily for this type of field use. Similarly, home gardeners and those doing yard and lawn work have similar problems requiring the user of a garden tool, such as a hoe, to stoop over in order to do the job properly and completely; which can cause excessive body strain and fatigue.

A crude attempt to solve this problem was proposed in U.S. Pat. No. 607,392 to Brune which was patented in 1898. This particular patent proposes to use screws to attach brackets to the bottom sole of a boot or shoe and to attach a curved knife thereto. Despite the fact that this device has been known for over 80 years, it has never achieved common usage because of its awkward construction and limited use for cutting weeds only.

Accordingly, there is a need for agricultural and garden tool implements which can be easily, readily and adjustably attached to any boot or shoe for a variety of precision agricultural, garden or lawn work.

DISCLOSURE OF THE INVENTION

The present invention relates generally to an agricultural or garden tool attachment for shoes or boots including a bracket, a garden tool adjustably attached to the bracket and an encompassing structure for extending under and around the toe or heel of a boot or shoe. Straps are provided for attaching the encompassing structure to the shoe or boot and other garden tools designed for many different purposes can be interchangeably attached to the bracket.

An object of the present invention is to provide an improved agricultural or garden tool to eliminate the need for stooping over or stretching when doing precision garden or agricultural work, thus reducing body strain and fatigue.

Another object of the invention is to provide an agricultural or garden tool of the aforementioned type for attachment to shoes or boots, thus, permitting use of the stronger leg muscles.

A further object of the present invention is to provide an agricultural or garden tool for shoes or boots having interchangeable blades of various configurations.

A still further object of the present invention is to provide a garden tool attachment for shoes or boots which will attach to either right or left shoe or boot without modification to the shoe or boot and without damage thereto.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view of a boot having a preferred embodiment of the present invention attached to the toe portion thereof;

FIG. 2 is a plan view of the main structural element of the encompassing structure for attachment to the toe of a shoe or boot;

FIG. 3 is a perspective view of the preferred embodiment shown in FIG. 1 and having a straight-bladed agricultural garden tool attachment adjustably attached to the front thereof;

FIG. 4 is an enlarged top plan view of the encompassing structure shown in FIGS. 1 and 3 with the bracket attached to the front thereof for attaching a garden tool thereto and a bracket at the rear thereof for holding the rear extremities of the encompassing structure together;

FIG. 5 is a cross sectional view taken along line 5—5 of FIG. 4;

FIG. 6 is a side elevational view of the second embodiment of the present invention showing an encompassing structure attached to the heel of a boot and having a blade adjustably attached to the rear thereof;

FIG. 7 is a plan view of the main structural component of the encompassing structure shown in the FIG. 6 embodiment;

FIG. 8 is a perspective view of the encompassing structure shown in FIGS. 6 and 7 without the blade attached thereto but showing the bracket for attaching a blade;

FIG. 9 is an enlarged top plan view of the heel encompassing structure having a bracket attached at the rear thereof for attachment of a blade thereto and a bracketed front thereof for adjusting the width for a particular shoe or boot to which it is to be attached;

FIG. 10 is an enlarged, partial, perspective view of a bracket and blade for attachment to the front of a boot or shoe, although the same structure is utilized on the rear thereof such that the embodiment of FIG. 1 and the embodiment of FIG. 6 utilize the bracket and blade structure shown in FIG. 10;

FIG. 11 is a cross sectional view taken along line 11—11 of FIG. 10;

FIG. 12 shows another embodiment of the present invention utilizing an aerator attachment and a somewhat different encompassing structure for the toe of a shoe;

FIG. 13 is a plan view of the main component of the encompassing structure shown around the toe of the shoe of FIG. 12;

FIG. 14 shows still another embodiment including an encompassing structure for the heel of a shoe and utilizing an aerator attachment attached thereto; and FIG. 15 is a perspective view showing some of the blade configurations and aeration devices which can be attached to the front or rear of the embodiments shown in FIGS. 1, 6, 10, 12 or 14.

BEST MODE FOR CARRYING OUT THE INVENTION

Referring now to the drawings wherein like reference numerals designate identical or corresponding parts throughout the several views, FIG. 1 shows a preferred embodiment (10) of the invention attached to a boot (11). Referring to FIGS. 2-5, it will be noted that a somewhat flexible metal or plastic toe encompassing member (12) has end openings (13) for receiving a strap (14) which extends around the boot (11) and has a buckle (15) for tightening down the strap when it is in place.

Additionally, the encompassing structure (12) includes lower openings (16) for receiving a flat metal bracket (17). This metal bracket (17) is first adjusted to the proper width, for example after the member (12) is strapped on to the boot (11) as shown in FIG. 1. The ends of the metal bracket (17) are bent upwardly from the position shown in dashed lines in FIG. 4 to the position shown in solid lines. Also, upper openings (18) are disposed in the encompassing member (12) for receiving an adjustable metal strap (19) which extends over the toe of the boot (11) as shown in FIG. 1. The strap (14) is preferably elastic, although two non-elastic straps will perform the needed function but will require more time to adjust them to the proper tension. Strap (19) is metal and adjustable so member (12) can be tightly secured onto the toe of shoe (11) and strap (14) can be removed, if desired.

A bracket (20) is rigidly connected to the front of the flexible member (12), for example as shown in FIG. 10. This bracket (20) has a threaded bolt (22) rigidly attached thereto, such as by welding.

Referring to FIG. 1, it is noted that a blade (23), having a sharpened front edge (24), is at a right angle with respect to an upstanding connecting member (25). The upstanding connecting member (25) has a slot (26) formed therein so that the upstanding connecting member (25) can be pushed up into the slot formed by the bracket (20) wherein the bolt (22) will extend through the slot (26). A washer (27) and threaded nut (28) are utilized for securing the upstanding connecting member (25) in whatever vertical position desired with respect to the bracket (20).

Referring to FIGS. 4 and 5, it is noted that after the encompassing structure (12) is properly fitted on the boot (11), the sheet metal member (17) is placed through the slots (16) to the position shown in dashed lines in FIGS. 4 and 5. Then the ends are bent up to the position shown in solid lines in FIGS. 4 and 5, in order to hold the encompassing structure (12) in its proper width position.

Referring now to FIGS. 6–9, it is noted that a heel encompassing member (32) is bent into the configuration shown best in FIG. 8 and wherein a flat metal member (17) is again used to hold the member (32) in its proper width position with respect to the heel of the boot (11). A bracket (20) is, of course, attached to the rear member (32) in the same fashion that the bracket (20) was attached to the toe of the embodiment (10) shown in FIG. 1. Openings (16) are formed through the member (32) for the purpose of receiving the flat metal member (17). Also holes (35) are formed in the top portion of the encompassing member (32) for receiving rivets (36) which hold non-elastic straps (37) and (38), having a buckle (39) on one end of member (38). Consequently, the blade (40) can be attached to the bracket (20) on the rear of the boot (11), as shown in the embodiment of FIGS. 6–9, noting that the blade (40) is tilted downwardly to some extent, rather than being exactly perpendicular to the upstanding member (25).

Referring now to FIGS. 12 and 13, it is noted that an encompassing member (42) has openings (43) at the edges thereof for receiving an elastic strap (59) having a buckle (53) thereon such that the encompassing structure (42) can be fitted on the shoe (41) as shown in FIG. 12. Openings (46) are provided in the bottom of the encompassing structure (42) and openings (45) are provided at the bottom of the encompassing structure (42) for receiving the metal band strap (17) like that shown in FIGS. 4 and 8. Also openings (46) are provided in the encompassing structure (42) for riveting a strap (47) thereto and having a buckle (48) for adjusting the tightness of the strap (47).

A metal plate (49) having spikes (51) attached to the bottom thereof provides a tool for aerating the soil by causing the plurality of projections (51) to extend into the ground.

Referring now to FIG. 14, it is noted that the shoe (52) has a plate (49) and aeration spikes (51) attached to a heel encompassing member (32) utilizing the metal bracket (17) precisely as in the aforementioned embodiments and having the adjustable bracket (20) attached to the rear thereof. Similarly, rivets (56) are utilized to attach the ends of an elastic strap (57) thereto and utilizing a buckle (58).

Referring now to FIG. 15, it is noted that a plurality of interchangeable tools can be attached to the bracket (20) on either the front or the rear of the aforementioned embodiments in a vertically adjustable manner depending upon the task to be done. For example, the blade (30) having a V-shaped sharpened portion (34) on the front thereof is most useful as a root extractor and a cultivator. The tool (40) having a sharpened front edge (44) is most useful for digging in general and for rock removal, although a version having a shortened blade is most useful for ground scraping or the like. The tool (50), having a front sharpened edge (54) is useful for vegetation removal and as a cultivator. Blade (60) with pointed tip (64) is useful for digging and rock removal. Blade (70) with reversible dual edges (74) and (75) is useful for vegetation removal, trenching and terrain shaping.

The tool (80), having a sharpened edge (84), and tool (90), having a sharpened edge (94), are very useful for cutting vines which lie along the top of the ground and for other times when it is desired to cut straight downwardly into something and where leverage is needed to push the blade straight down such as in preparation for planting.

The attachment (100), having front and rear serrated edges (104), is used for mulching and compost mixing, while the attachment (110), having a front and rear edges (114) thereon, is most useful for edging lawns along the sidewalk or the like and for harvesting plants. When blade (110) is reversed or inserted into the bracket (20) in an inverted position from that shown in FIG. 15, it is in the harvesting position; when it is inserted in the bracket (20) in the position shown in FIG. 15, it is in the lawn edging position.

The attachment (120) is the aerator shown in FIG. 14 for poking holes into the ground to allow air to enter, it being well known that plants and lawns need air to grow best. Referring again to FIG. 6, it is noted that the blade (40) can be inverted such that the sharpened portion (44) extends down under the heel of the boot (11) so that a forward kicking motion would cause the sharpened edge (44) to come in contact with plants or roots or whatever it is desired to cut, trench or scrape. This inversion is simply done by loosening the nut (28), sliding the member (25) down out of the bracket (20), rotating the member (25) 180 degrees around about the longitudinal axis of slot (26), and then re-inserting the member (25) into the bracket (20). The adjusting screw (28) can then be tightened again in whatever elevation it desired of the blade (40) with respect to the boot (11).

Accordingly, it will be appreciated from the embodiments disclosed that this invention is useful for cultivation, root extraction, digging, trenching, planting, vegetation removal, aeration, mulching, compost mixing, lawn edging, ground scraping, terrain scraping, removing or digging rocks, harvesting crops, etc. The different blades are chosen depending upon the terrain and different soil compositions as well as for the uses desired. These blades can be made smaller or larger or of different configurations as needed. In use, the user merely stands erect and has no back strain while using the stronger leg muscles. Use of this particular invention frees both hands such that the user can also use a hoe, rake, shovel, pick axe, wheel barrow, lawn mower, weed trimmer, rotary tiller, or the like at the same time. For most of the blades, a kicking action is used in whatever direction is needed to do the desired task.

Accordingly, it will be appreciated that the present invention does indeed accomplish all of the aforementioned objects. Obviously many modifications and variations of the present invention are possible in light of the above teachings. It is therefore to be understood that, within the scope of the appended claims, the invention may be practiced otherwise than as specifically described.

I claim:

1. An agricultural tool attachment for footwear comprising:
   a bracket comprising a vertically disposed channel member having a centrally disposed threaded member extending therefrom;
   a garden tool comprising a blade having a slotted plate attached to one end thereof and having a free end at the other end thereof, said slotted plate being of a size to be slideably received into said channel member;
   cooperating securing means comprising a threaded nut for being threadably received onto said threaded member for attaching said garden tool to said bracket;
   encompassing means comprising a toe encompassing member having a plurality of openings including: end openings; lower openings; and, upper openings formed on each side of said encompassing member; wherein the encompassing member extends partially under, partially over, and around the sides of the toe of said footwear;
   first strap means attached to selected ones of said plurality of openings on each side of said encompassing member for extending around a portion of the toe of the footwear for holding said encompassing member securely to said footwear; and,
   second strap means attached to selected other ones of said plurality of openings on each side of said encompassing member for extending around the rear and side of the footwear.

2. The tool of claim 1; wherein the slotted plate and the free end of said blade are aligned with one another.

3. The tool of claim 1; wherein the slotted plate and the free end of said blade are disposed perpendicular to one another.

4. The tool of claim 1; wherein, the first strap means is attached to said encompassing member by passing through the upper openings.

5. The tool of claim 1; wherein, the first strap means is attached to said encompassing member by passing through the lower openings.

6. The tool of claim 1; wherein, the second strap means is attached to said bracket member by passing through the end openings.

7. An agricultural tool attachment for footwear comprising:
   a bracket comprising a vertically disposed channel member having a centrally disposed threaded member extending therefrom;
   a garden tool comprising a blade having a slotted plate attached to one end thereof and having a free end at the other end thereof, said slotted plate being of a size to be slideably received into said channel member;
   cooperating securing means comprising a threaded nut for being threadably received onto said threaded member for attaching said garden tool to said bracket;
   encompassing means comprising a heel encompassing member having a plurality of openings formed on each side of said encompassing member; wherein, the encompassing member extends around and partially under the heel of said footwear;
   a first strap means extending under the heel of said footwear and secured to said encompassing member by passing through selected ones of said plurality of openings on each side of said encompassing member; and,
   a second strap means operatively attached to other selected ones of said plurality of openings on each side of said encompassing member for extending over the top and across the ankle portion of the footwear for holding said encompassing member securely to said footwear.

8. The tool of claim 7; wherein, the slotted plate and the free end of said blade are aligned with one another.

9. The tool of claim 7; wherein, the slotted plate and the free end of said blade are disposed perpendicular to one another.

10. The tool of claim 7; wherein, the first strap means comprises a metal member.

* * * * *